United States Patent [19]

Fujita et al.

[11] 4,231,240
[45] Nov. 4, 1980

[54] SCREW PLUG ASSEMBLY

[75] Inventors: Masao Fujita, Fukushima; Kiyoshi Kitaori, Hiratsuka, both of Japan

[73] Assignees: Nissan Shatai Kabushiki Kaisha, Hiratsuka; Kokusan Kinzoku Kogyo Kabushiki Kaisha, Tokyo, both of Japan

[21] Appl. No.: 929,194

[22] Filed: Jul. 28, 1978

[51] Int. Cl.³ ............................................. B65D 55/14
[52] U.S. Cl. ...................... 70/173; 70/165; 70/231; 220/210; 220/288
[58] Field of Search .................. 70/163, 165, 171, 173, 70/231, 169, 221, 222, 172; 220/210, DIG. 33, 86 R, 288

[56] References Cited

U.S. PATENT DOCUMENTS

| 510,046 | 12/1893 | Parker | 70/165 UX |
|---|---|---|---|
| 1,898,373 | 2/1933 | Jay | 70/173 |
| 1,970,660 | 8/1934 | LaFever | 70/231 X |
| 1,997,203 | 4/1935 | Shera | 220/288 X |
| 2,070,692 | 2/1937 | Stone | 70/165 |
| 2,696,100 | 12/1954 | Nehls | 70/169 X |
| 3,998,078 | 12/1976 | Detwiler | 70/171 |
| 4,107,961 | 8/1978 | Evans | 70/165 |
| 4,132,091 | 1/1979 | Aro et al. | 70/165 |
| 4,142,756 | 3/1979 | Henning et al. | 220/86 R X |
| 4,164,302 | 8/1979 | Gerdes | 70/172 X |

FOREIGN PATENT DOCUMENTS

| 757683 | 10/1933 | France | 70/165 |
|---|---|---|---|
| 1014933 | 6/1952 | France | 220/210 |
| 1190429 | 3/1959 | France | 70/169 |

Primary Examiner—Roy D. Frazier
Assistant Examiner—Carl F. Pietruszka
Attorney, Agent, or Firm—Fleit & Jacobson

[57] ABSTRACT

The invention consists of a screw cap assembly including a manually operable handle piece rotatable in both directions, a cylindrical case mechanically coupled with the handle piece for unitary rotation therewith, a key-operable cylinder lock mounted in the cylindrical case and capable of rotating only partially and independently therefrom when key-operated from outside, and a screw plug proper operably connected with the handle piece through the cylindrical case. The plug can be rotated in both screw-advancing and screw-retracting directions when the cylinder lock is key-operated to its unlocked position but only in the screw-advancing direction when the lock is in its locked position.

6 Claims, 5 Drawing Figures

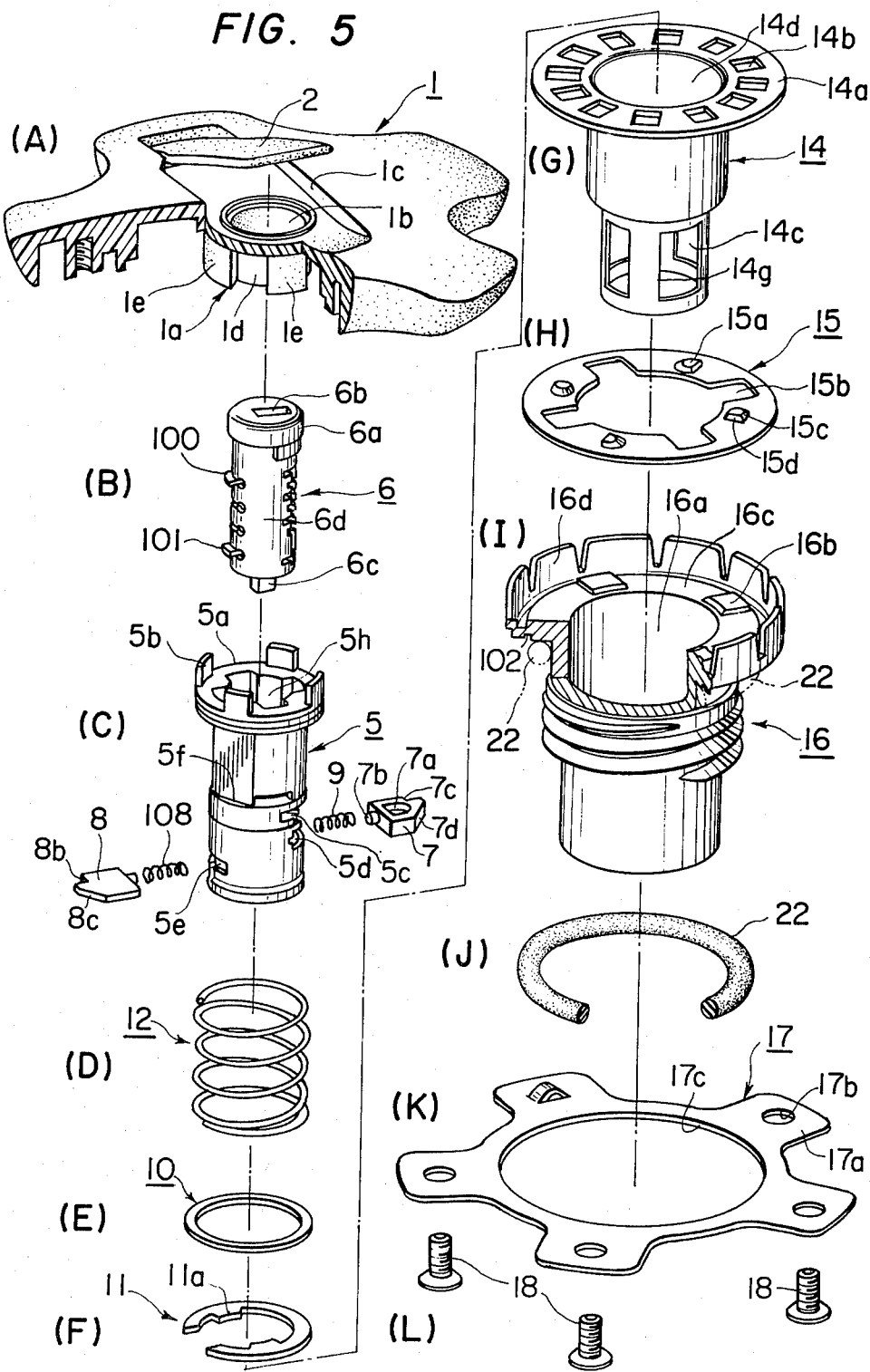

SCREW PLUG ASSEMBLY

BACKGROUND OF THE INVENTION

This invention relates to an improved screw cap assembly. More specifically, it relates to such a screw cap assembly, especially adapted for closing the liquid supply inlet of an automotive gasoline or lubricating oil reservoir tank and the like.

As is well known, such an assembly comprises a manually operable and rotatable handle piece; a hollow screw plug proper in the form of a peripherally screw-threaded sleeve which is normally mechanically connected with said handle piece for jointly turning togetherwith; and a cylinder lock mounted in the said screw plug proper for being locked or unlocked from outside with a manual key normally common to the conventional automotive engine key. When the cylinder lock is operated to its locking position, the handle piece is freed from its mechanical connection with the screw plug proper, thus the former is brought into a freely and independently turnable position. On the other hand, when the cylinder lock is key-manipulated from outside to its unlock position, the mechanical connection of the handle piece with the screw cap proper is restored so that both members are rotatable together.

The purpose of the above free-connection is to prevent forced and intentional breakage of the screw cap assembly by an unauthorized person, which may occur if the handle piece and the screw cap proper are mechanically connected with each other in a rigid and permanent way.

When gasoline or the like liquid is supplemented to the tank reservoir through its supply inlet, the cylinder lock must be unlocked at first and then the cap screw assembly is unscrewed. After finishing of the fuel or the like supplementing job, the screw cap assembly is reintroduced into the tank inlet and screwed thereinto. And then, the cylinder lock is brought into its locked position by use of the key, for freeing the handle piece from rigid connection with the cap screw proper. With such conventional design of the screw cap assembly, the lock operation thereof must be made only after tight screwing of the screw cap and for this job, the key is necessary for use by the gasoline stand service man for the locking job and thus, the car driver can not enjoy car radio programs or the like so far as the key is held by the service man. In addition, the car gasoline gauge can not operate without the key held in position on the car instrument panel.

It is, therefore, the first object of the invention to provide an improved screw cap assembly of the above kind in which the handle piece can be made free in its unscrewing direction, but is coupled to the screw plug in its tank inlet-closing direction, even if the cylinder lock has been locked.

It is a further object of the invention to provide an improved screw cap assembly which is provided with such means for preventing excess tightening of the screw cap.

It is still a further object to provide an improved screw cap assembly having such manually operable handle piece capable of separating from connection with the screw cap proper when a sudden and severe mechanical shock is applied to the assembly.

These and further objects, features and advantages of the invention will become more apparent when reading the following detailed description of the invention with reference to the accompanying drawings in which:

BRIEF DESCRIPTION OF THE DRAWINGS

FIG. 5 is an exploded perspective view of several constituent parts of the screw cap assembly.

DETAILED DESCRIPTION OF THE INVENTION

In the following, a preferred embodiment of the invention will be described in detail with reference to the accompanying drawings.

Figure 1:
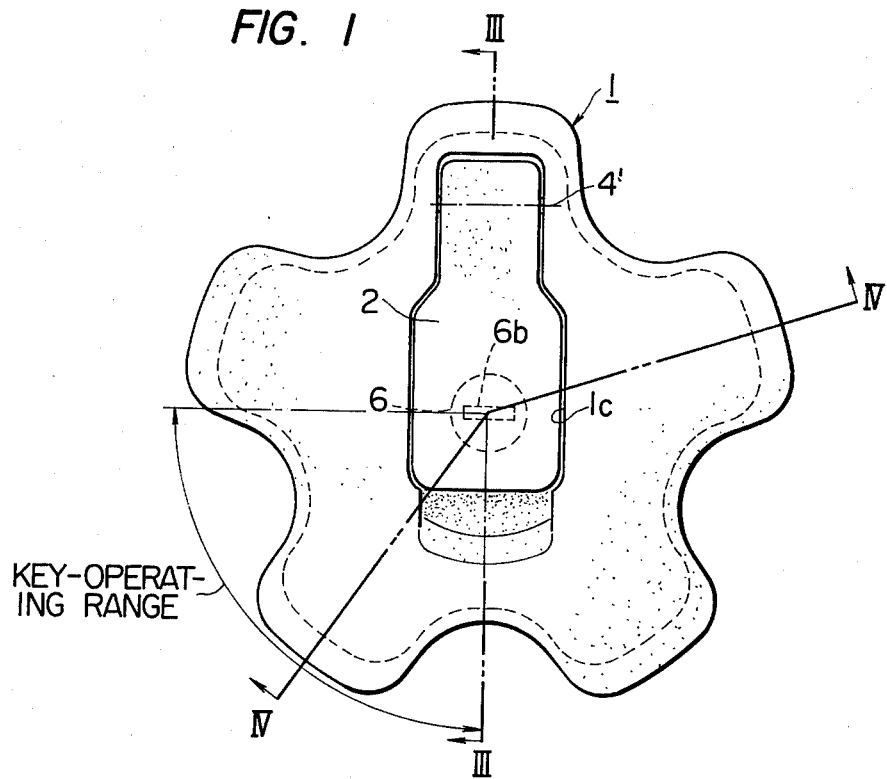
FIG. 1 is a top plan view of a handle piece which is a member of the screw cap assembly according to the invention.
Figure 2:
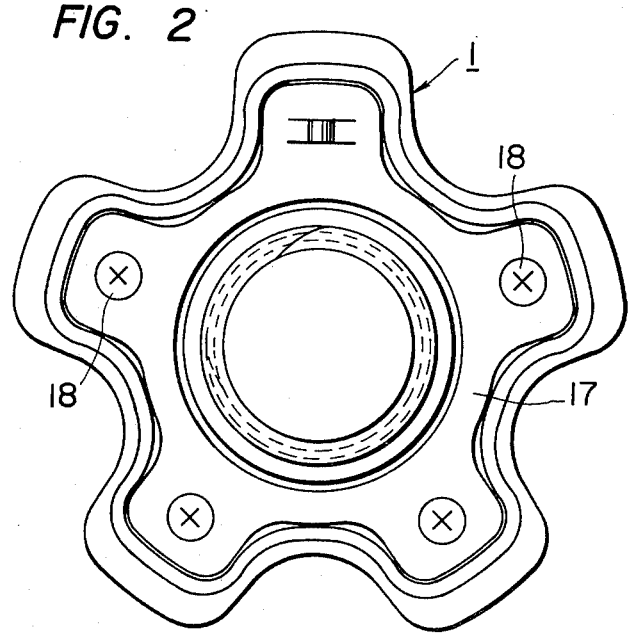
FIG. 2 is an inverted plan view of the handle piece shown in FIG. 1.
Figure 3:
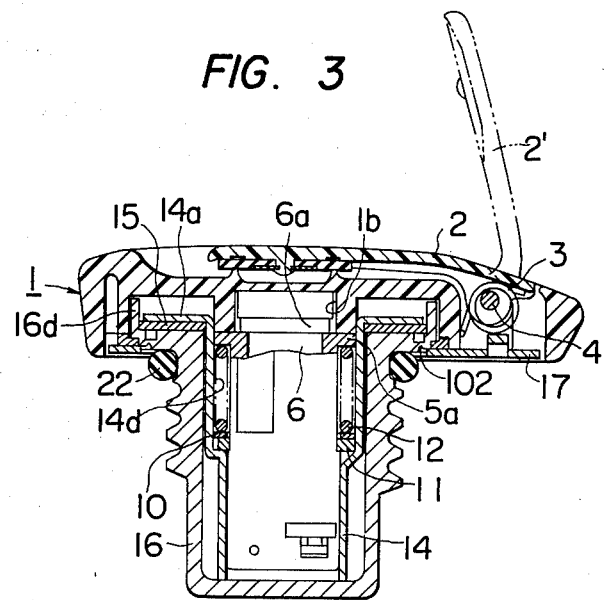
FIG. 3 is a longitudinal section of the screw plug assembly according to this invention, being taken along a section line III—III shown in FIG. 1.

In the drawings, numeral 1 represents a five-leaf handle piece acting as a cover member on which a normally closed flap 2 is pivotably mounted at 4 (FIG. 3). The axis of pivot pin 4 is shown at 4' in FIG. 1. For urging the flap 2 towards its closed position, a return coil spring 3 is wound on the pivot pin 4 (FIG. 3).

A cylindrical case 5, FIGS. 4 and 5(C), has an enlarged top collar 5a which is mechanically coupled with a centrally depending collar 1a of handle piece 1, the inside 1b thereof, FIGS. 3 and 5(A), being perforated for insertion of a key, not shown, and as will be later more fully described. The flap 2 has substantially a stepped rectangular plan shape, and the handle piece or cover 1 is correspondingly recessed at 1c (FIG. 1), for snugly receiving the flap 2 in its closed position.

The cylindrical case 5 has an enlarged top 5a having a plurality of separated longitudinal projections 5b. See, specifically FIG. 5 at (C). Said depending collar 1a is formed with a plurality of thickened projections 1e, a recess 1d being thereby formed between each pair of these projections 1e (FIG. 5 at (A) for snugly receiving one of the longitudinal projections 5b when the cylindrical case 5 has been coupled with the handle piece 1.

Numeral 6 denotes a conventional cylinder lock having an enlarged top end 6a which is mounted on a shoulder portion defined between the main cylindrical portion and the enlarged head 5a of cylindrical case 5. See, FIG. 4.

Cylinder lock 6 is formed with a key insertion hole 6b. See, FIG. 1 and FIG. 5 (B). The lock 6 is provided as conventional with a plurality, preferably six in number, of disc tumblers 100, FIG. 5 (B), corresponding to the key ways of the key, not shown. In FIG. 5 (B), only one of these tumblers is shown representatively. A depending pin-like projection 6c is formed on the lower end of the lock 6, the purpose of which will be later described. Numeral 101 represents a spring-loaded and depressible bottom disc tumbler acting as a slip-out prevention dog adapted for cooperation with a window-like opening 5c formed on the case 5, when the lock 6 has been coupled with the cylindrical case 5.

The cylindrical case 5 is formed preferably at different heights with recesses 5d and 5e, spaced preferably by 180 degrees when seen from above, for receiving latches 7 and 8 loaded by respective urging springs 9 and 108. The upper latch 7 is formed with a recess 7a which cooperates with the depending projection 6c, FIG. 4 and FIG. 5 (B), while the lower latch 8 always occupies its projecting position from the body of cylinder case 5, as shown in FIG. 4.

Numeral 14 represents a clutch case which is formed with a flange head 14a having a number of spaced openings 14b. The clutch case 14 is further formed with four larger openings 14c, FIG. 5 at (G), one of which is arranged to cooperate with the key-operated upper latch 7.

The lower latch 8 is adapted for cooperation with a further one of these openings 14c.

Coil spring 12, ring washer 10 and spring clip 11 are shown at (D), (E) and (F) in FIG. 5. However, these elements are shown in this FIG. 5 somewhat larger than other elements shown therein, for clear representation thereof.

Coil spring 12 is mounted around the upper part of cylindrical case 5 and then, ring washer 10 is positioned directly below the coil spring and around the case 5. Then, clip 11 is positioned therearound for the prevention of possible detachment of these former elements 10 and 12 from the case 5. This mutual positional relationship may be easily understood from FIG. 4. For retaining the clip 11 in position, the latter is formed with diametrally opposite, inwardly directing projections 11a which are engageable with recesses 5f, FIG. 5 at (C), formed on the outer peripheral surface of the case 5.

Figure 4:
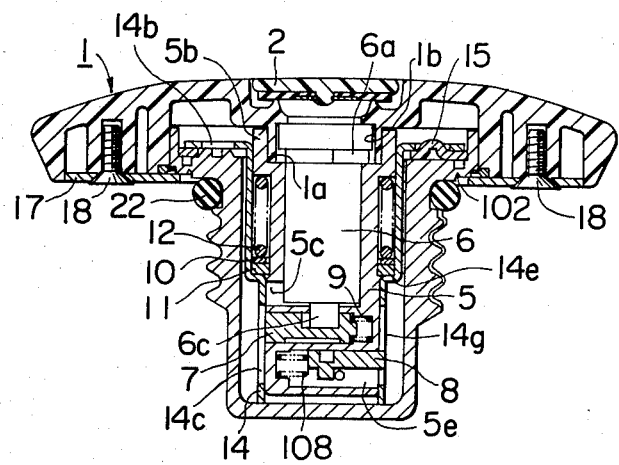
FIG. 4 is a longitudinal section of the screw plug assembly, the section being taken along a section line IV—IV shown again in FIG. 1.

Clutch case 14 is formed with an axial bore 14d adapted for receiving the cylindrical case 5 in position, as shown in FIG. 4. For this purpose, the bore 14d is formed at its intermediate level with a ring shoulder 14e (FIG. 4) on which the three elements 12; 10 and 11 are mounted.

Cylindrical case 5 is formed centrally with a longitudinal bore 5h, FIG. 5 at (C), adapted for receiving the cylinder lock 6, as will be most clearly understood from FIG. 4.

Numeral 15 represents a clutch ring which is provided on its top surface with four inclined and separated projections 15a which are arranged in a circle. These inclinations allow a counter clockwise rotation relative to the flange head 14a of clutch case 14. Recesses 15b are alternately formed on the top surface of the clutch ring 15, with the said inclined projections 15a. See FIG. 5 at (H).

Numeral 16 represents a screw plug or cap, having a central bore 16a. A plurality of projections 16b, in this case, four in its number, are formed on the top surface of the screw cap and adapted for cooperation with the said recesses 15b on the clutch ring when the latter is assembled to the screw plug 16 from above. See FIG. 5 at (I). After assembling, these elements are rigidly united together by press-fitting technique, as an example. A series of spaced longitudinal projections 16d are formed on the enlarged ring head 16c which is formed in turn with said projections 16b.

An intermediate connecting plate 17 takes substantially the form of a ring having a plurality of radial projections 17a, each of which is formed with an opening 17b, as shown at (K) of FIG. 5, for receiving a fixing screw 18. See also FIG. 5 at (L). As seen, the plate 17 is formed with a large central bore shown at 17c.

For assembling the aforementioned numerous constituents, cylinder lock 6 is coupled from below with handle piece 1 by inserting the enlarged top end 6a of the former into the central bore 1b of the latter.

Then, latches 7 and 8 are inserted into recesses 5d and 5e of the cylindrical case 5, together with respective urging springs 9 and 108. For correct positioning of these springs, the upper latch 7 is formed with a spring-receiving projection 7b and cylindrical case 5 is formed on its inside wall surface with a similar projection. Then, the thus preassembled cylindrical case 5 is coupled from below with cylinder lock 6 in such a way that the main and reduced diameter portion 6d of the latter is received snugly in the central bore 5h of the former until the longitudinal projections 5b are received in the recesses 1d. Before execution of this subassembling job, the tumbler 101 is manually depressed against the action of the respective urging springs, not shown, cooperating with these tumblers, as is commonly known. Upon execution of this job, however, the lower tumbler 101 will project outwardly under the action of its urging spring and engage with window-like opening 5c, so as to act as a slip-out prevention dog, as was referred to hereinbefore. On account of relatively large lateral dimension of the opening 5c, however, the cylinder lock 6 may make a partial rotational movement within the range of about 90 degrees, relative to the coupled cylindrical case 5, as is seen from FIG. 1 and will be more fully described hereinafter. During this subassembling job, the lower projection 6c depending from cylinder lock 6 is brought into motion-transmitting engagement with the recess 7a formed on upper latch 7.

Then, coil spring 12, ring washer 10 and spring clip 11 are placed successively from below around the cylindrical case 5 and directly below the enlarged top 5a of the latter, and until the opposing projections 11a are brought into engagement with the recesses 5f formed on cylindrical case 5.

Then, clutch case 14 is coupled from below with cylindrical case 5. Upon execution of this coupling job, lower latch 8 projects outwardly from one of openings 14c of the former case 14, while upper latch 7 projects similarly through the opposed one of the openings 14c.

Next, the subassembly comprising screw cap 16 and clutch ring 15 press-fitted thereon, is coupled rotatably with clutch case 14 in such a way that inclined projections formed on the ring 15 are kept in somewhat loose engagement with spaced openings 14b formed through flange head 14a of the clutch case 14. Then, sealing ring 22, FIG. 5 at (J), is put on the screw plug 16, as most specifically shown in FIG. 5 at (I).

Finally, holder ring plate 17 is attached from below to the bottom of handle piece 1 and firmly held in position by tightening the fixing screws 18, as most clearly shown in FIG. 4. In this position, the inside periphery 17c of holder ring plate 17 engages slightly the top flange or ring head 16c for the prevention of otherwise possible detachment of the screw plug 16 and related and coupled constituents of the screw plug assembly from the handle piece 1.

It will be easily seen that the screw cap assembly assembled in the foregoing way is capable of providing a unitary rotation of the screw cap 16 with the manually rotatable handle piece 1 both in its screw-advancing and screw-retracting directions, because the cylindrical case 5 is operatively coupled with the clutch cylinder 14 by means of the upper and lower latches 7 and 8 now being kept in engagement with a pair of 180°-apart and thus opposite openings 14c formed through the lower cylindrical wall of clutch cylinder 14. For attaining this motion-transmitting relationship, the latches 7 and 8 are formed with stepped angular recesses 7e and 8b, respectively, and as is most clearly seen, these latches 7 and 8 are arranged mutually in opposite phases on an imaginary circle concentric with the central axis of the cylindrical case 5 as well as that of the clutch cylinder 14. This full motion-transmitting position corresponds to the unlocked position of cylinder lock 6.

For bringing the cylinder locked to its lock position, the flap 2 is raised manually from its closed position (see the full line 2 in FIG. 3) to its opened position (see the chain-dotted line 2' in FIG. 3). Then, the key is inserted into the key hole 6b of cylinder lock 6 and turned counter clockwise by 45°–90° in FIGS. 1 and 5. The upper latch 7 is drawn-in and receded from position and brought into its freed position from engagement with clutch cylinder 14. Thus, in this position, motion will be transmitted from handle piece 1 to screw plug proper 16 in the screw-advancing or tank inlet-closing direction only, while, even if the handle piece is manually rotated in its unscrewing direction, no motion is transmitted therefrom towards the screw plug and thus the former becomes free in this direction. This is because latch 8 has an inclined camming surface 8c opposite recess 8b and when the camming surface engages the edge of window opening 14c, latch 8 is withdrawn inside of the clutch case, which is thereby disconnected from the cylinder case.

With either the unlocked or locked position of the cylinder lock, the handle piece may be effectively turned for screwing in the screw plug proper 16 so as to tightly close the tank inlet opening, not shown.

More specifically, in the unlocked position of the cylinder lock, the screw plug-tightening operation is effected in the following way.

In this case, upper latch 7 projects through the corresponding opening 5d slightly from the cylindrical case 5. However, this latch is not in engagement with window opening 14c, while the lower latch 8 projects partially into one of the window openings 14c of case 14 and angular recess 8b formed on the latch is kept in operating engagement with window edge 14g. Therefore, rotational motion is transmitted in this case from handle piece 1 to cylindrical case 5 and further to clutch case 14. Rotation will thus be transmitted from the latter through clutch ring 15 to screw cap proper 16 in the screw advancing direction thereof.

When the screw cap proper 16 has been screwed into to a certain predetermined tightened position in the correspondingly screwed tank inlet opening, not shown, and if further and excess rotational effort should be forcibly applied to handle piece 1 and thence toward the screw cap proper, the clutch cylinder 14 is forcibly rotated in the same screw advancing direction. However, in this case, the inter-opening zones between the flange openings 14b will ride over the inclined surfaces of clutch projections 15a of clutch ring 15, thereby making a combined motion of rotational sliding and intermittent up-and-down movements and against the action of spring 12. Thus, it will be seen that the screw plug proper 16 can not be further screwed in although the cylindrical case and the clutch case are rotated in unison with the handle piece. In this way, an excess tightening of the screw plug proper can be effectively prevented.

With the cylinder lock in its unlocked position and when the handle piece is rotated manually in the opposite screw retracting direction, the upper latch 7 is caused, as was hereinbefore mentioned, to project into one of window openings 14c so that angular recess 7c formed at the outer corner of the latch is brought into engagement with an opposite window edge, shown, however, with same reference numeral 14g as before, of window opening 14c, thereby motion being transmitted from handle piece 1 through cylindrical case 5 and upper latch 7 to clutch case 14 in the screw retracting direction. The plug-loosening rotation will be further transmitted therefrom through clutch ring 15 to screw plug proper 16, until the screw plug assembly is completely screwed out from the mating tank inlet. A plug screw-in operation can be effectively executed as before and an excess turning will also be prevented in the aforementioned way. In addition, it should be noted that head flange 16c is formed at its lower surface with a weaked wall portion, preferably in the form of a U-, or V- or the like ring groove 102. Such weakened wall portion may be plural if desired.

By the provision of such weakened portion or portions, the manual piece 1 can be separated completely from the other main constituents of the screw plug assembly when the latter is subjected to severe and grave outside mechanical shocks in an emergency accident such as car collision. In this way, mechanical damage of the screw plug proper or the like may be effectively prevented so that additional hazard and the like can be avoided.

The embodiments of the invention in which an exclusive property or privilege is claimed are as follows:

1. A screw cap assembly comprising a manually rotatable handle piece, a cylindrical case connected with said handle piece for rotation therewith, a key-operated cylinder lock within said cylindrical case, said handle piece having an opening providing access for inserting a key into said lock to rotate said lock relative to said case between a locked position of the lock and an unlocked position of the lock, an externally threaded cylindrical screw plug surrounding said case, clutch means between said case and said screw plug for transmitting rotary motion from said case to said screw plug, means providing a driving connection between said clutch means and said plug and latch means carried by said case for effecting a drive connection between said case and said clutch means both in the screw advancing and screw retracting directions of rotation of said plug when said lock is in its unlocked position and for effecting a drive connection between said case and said clutch only in the screw advancing direction of rotation of said plug when said lock is in its locked position while allowing rotation of the case and handle piece relative to the plug in the screw retracting direction of the plug when said lock is in its locked position, said latch means including a first latch member, complimentary latching formations on said first latch member and on said clutch means providing a positive drive connection between said case and said clutch means in the screw advancing direction of rotation of said screw plug and allowing relative movement between said case and said clutch means in the screw retracting direction of rotation of said screw plug, means urging said first latch member into engagement with said clutch means to interconnect said complimentary latching formations, a second latch member, further complimentary latching formations on said second latch member and on said clutch means providing a positive drive connection between said case and said clutch means in the screw retracting direction of rotation of said screw plug, further means urging said second latch member into engagement with said clutch means to interconnect said further complimentary latching formations and means providing a mechanical connection between said lock and said second latch member for withdrawing said second latch member from engagement with said clutch means and disconnecting said further complimentary latching formations when said lock is in its locked position.

2. The assembly as defined in claim 1, wherein said clutch means includes a cylindrical clutch case surrounding said cylinder case and defining openings for receiving said latch members and said latch members projecting radially from said cylinder case into said openings under the influence of said urging means.

3. The assembly as defined in claim 2, wherein said first latch member has a stepped profile on one side for engagement with one edge of the respective opening in said clutch cylinder to provide said positive drive connection and an inclined camming surface on the other side for contacting the opposite edge of the respective opening in said clutch cylinder and disengaging the latch member from said clutch cylinder when the cylinder case is rotated towards said opposite edge.

4. The assembly as defined in claim 1, wherein said means providing a driving connection between said clutch means and said plug includes torque-limiting means disconnecting said clutch means from said plug when resistance to rotation of said plug in the screw advancing direction of the plug exceeds a predetermined value.

5. The assembly as defined in claim 4, wherein said means providing the driving connection between said clutch means and said plug comprises a first flange on said clutch means, a second complimentary flange on said plug, complimentary engaging male and female formations on the respective flanges and spring means urging said flanges together with said complimentary formations in engagement and said formations moving out of engagement against the action of said spring means when resistance to rotation to the plug in the screw advancing direction exceeds said predetermined value.

6. The assembly as claimed in claim 5, wherein said screw plug includes an upper peripheral flange means having an outer weakened region and wherein said handle piece includes a connecting plate engaging said weakened region whereby abnormally severe loading of said handle piece effects separation of said weakened region and said handle piece from said screw plug.

* * * * *